(12) United States Patent
Ashiya

(10) Patent No.: US 6,989,976 B2
(45) Date of Patent: Jan. 24, 2006

(54) OVERCURRENT PROTECTION CIRCUIT

(75) Inventor: Hiroyuki Ashiya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 442 days.

(21) Appl. No.: 10/319,710

(22) Filed: Dec. 16, 2002

(65) Prior Publication Data

US 2003/0123205 A1    Jul. 3, 2003

(30) Foreign Application Priority Data

Dec. 17, 2001  (JP)  .......................... P2001-382829

(51) Int. Cl.
*H02H 5/04*  (2006.01)
(52) U.S. Cl. ........................ 361/27; 361/93.8
(58) Field of Classification Search ............... 361/93.1, 361/93.7, 93.8, 24, 25, 27
See application file for complete search history.

(56) References Cited

U.S. PATENT DOCUMENTS 3,740,613 A  *  6/1973  Strachan .................... 361/27
6,603,277 B2 *  8/2003  Yoshimura ................. 318/139

FOREIGN PATENT DOCUMENTS

GB    1 168 972 A   10/1969
JP    2001-145251    5/2001

OTHER PUBLICATIONS

Japanese Abstract No. 03107327, dated May 7, 1991.
Japanese Abstract No. 10042432, dated Feb. 13, 1998.

* cited by examiner

*Primary Examiner*—Ronald Leja
(74) *Attorney, Agent, or Firm*—Sughrue Mion, PLLC

(57) ABSTRACT

A resistance value variable element (18a) changes its resistance value in response to abnormal exothermic heat caused by an overcurrent of an external electrical equipment (3). A bias voltage outputted from a bias voltage output circuit (18) changes in accordance with the change of the resistance value. A relay (13) is controlled so as to be opened/closed in accordance with a switching control signal which is controlled in its supply by a second transistor element (17) based on the change of the bias voltage. According to such a control, power interruption and automatic restoring can be made possible. In the overcurrent protection circuit having such an automatic restoring function, the resistance value variable element is not connected in series with a coil (13a) unlike the conventional technique but contained in the bias voltage output circuit for supplying the switching control signal for exciting the coil.

6 Claims, 4 Drawing Sheets

OVERCURRENT PROTECTION CIRCUIT

BACKGROUND OF THE INVENTION

The present invention relates to an overcurrent protection circuit and, in particular, relates to an overcurrent protection circuit having an automatic restoring function of automatically restoring to a normal state from a power interruption state caused by an overcurrent.

In recent years, various kinds of electrical equipments driven by a vehicle-mounted battery are mounted on the vehicle. An overcurrent protection circuit is known which has a function of interrupting power supply to the electrical equipments based on the detection of abnormal exothermic heat caused by an overcurrent flowing through the electrical equipment and an automatic restoring function of automatically restoring to a normal state upon extinction of the abnormal exothermic heat. Such an interruption and automatic restoring of the power supply is performed by controlling the relay including a coil so as to be opened and closed. A conventional example is arranged in a manner that a current same as that flowing through the coil also flows through a temperature detection element for detecting the abnormal exothermic heat, so that there arise a problem that it is difficult to adjust the time for the power interruption and the time for the automatic restoration. The conventional example having such a problem will be explained with reference to FIG. 4.

FIG. 4 is a circuit diagram showing an example of a conventional overcurrent protection circuit. In this case, the explanation will be made on the assumption that the overcurrent protection circuit is incorporated within an electric coupling box of a function circuit embedded type called a junction block which is frequently employed in vehicles recently.

An electric coupling box 9 shown in FIG. 4 is mounted on the vehicle. A battery 2 and a motor 3 are coupled to the power input terminal 91 and the external output terminal 92 of the electric coupling box, respectively. The battery 2 is a known battery of 12 V and the motor 3 is a motor for driving a fan for cooling an engine, for example. The motor 3 is provided with two power source terminals 3a, 3c and two earth terminals 3b, 3d. The motor is a known four-terminal type motor which rotation speed is varied in accordance with a driving signal supplied to the power source terminals 3a, 3c. For example, when the power is supplied to one of the power source terminals 3a and 3c, the motor rotates at a low speed, whilst when the power is supplied to both the power source terminals 3a and 3c, the motor rotates at a high speed. In this case, the explanation will be made as to the case where the power is supplied to both the power source terminals 3a and 3c in order to simplify the explanation.

Within the electric coupling box 9, various kinds of electronic parts and resin parts are housed and a bus bar of a conductive plate shape for distributing the power supplied from the battery 2 is disposed. A PTC (positive temperature coefficient thermistor) 93 serving as a temperature detecting element is disposed in the vicinity of the bus bar so that an over current flowing through the bus bar is detected based on the temperature monitored by using the PTC 93. Within the electric coupling box 9, a relay 97 is provided which is arranged in a manner that a coil 97a excited by a predetermined current closes/opens a contact 97b thereby to control the power supply from the battery 2 to the motor 3. Within the electric coupling box 9, a CPU 95 is provided which is arranged to receive an external control signal inputted from a signal input terminal 94 and output a switching control signal for performing the opening/closing control of the relay 97.

In the aforesaid configuration, for example, when a not-shown ignition switch is turned on, the external control signal is inputted into the CPU 95 through the signal input terminal 94. In response to the external control signal, the CPU 95 outputs a high-level signal to turn on a transistor element 96. Simultaneously, a current flows into the coil 97a of the relay 97 from the battery 2 through the power input terminal 91 thereby to close the contact point 97b. As a result, the current from the battery 2 is supplied to the power source terminals 3a, 3c of the motor 3 through the contact point 97b of the relay 97 and the external output terminal 92, whereby the motor 3 is placed in a driven state.

In the driven state, supposing that the vehicle runs on a flooded road, for example, the fan driven by the motor 3 is locked or placed in a similar state due to the flooding. However, since the motor 3 continues to drive the fan against the resistance of the water, an overcurrent called as a lock current flows. That is, the overcurrent flows into the bus bar, and so abnormal exothermic heat is generated from the bus bar. Due to the abnormal exothermic heat, the PTC 93 abruptly increases its resistance value, so that current stops flowing into the coil 97a of the relay 97. As a result, the contact point 97b of the relay 97 opens thereby to stop the current supply to the motor 3. Thus the overcurrent disappears and so the temperature of the bus bar reduces, whereby the electric parts, the resin parts and the motor 3 are protected from the overcurrent.

On the other hand, if the current supply to the motor 3 is kept to be stopped, the cooling effect of the engine can not be obtained. Thus, in the case where the vehicle passed the flooded road and the temperature of the bus bar reduced sufficiently, for example, the motor 3 is started to be driven again due to the function reverse to the aforesaid function. That is, when the current supply is stopped and the temperature of the bus bar reduced sufficiently, the resistance value of the PTC 93 reduces and so the current starts flowing again through the coil 97a of the relay 97. As a result, the contact point 97b of the relay 97 is closed and so the current is started to be supplied to the motor 3 again thereby to drive the motor 3 again. In this manner, the conventional example has an automatic restoring function. Incidentally, the conventional example is supposed that the sufficient countermeasure for water-proof is performed.

However, since the shapes and the kinds of the bus bars, the kinds of external electric equipments etc. each being controlled in its on/off operation are not always same, it is necessary to select the PTC 93 having temperature characteristics suitable thereto. However, according to the aforesaid conventional example, since the PTC 93 and the coil 97a are connected in series, a current equal to that flowing through the coil 97a also flows through the PTC 93. Thus, in the conventional example, in order to adjust the times or timings of the power interruption and the automatic restoring in accordance with the shapes and the kinds of the bus bars and the kinds of external electric equipments etc., it is required to select the PTC 93 in accordance with the current flowing through the coil 97a. That is, the selection of the PTC 93 depends on the current flowing through the coil 97a. Thus, according to the conventional example, it is difficult to adjust the times of the power interruption and the automatic restoring as desired. In particular, since it is necessary to obtain the PTC 93 with a relatively large capacity in order to select the PTC 93 through which the current equal to that flowing through the coil 97a flows, most of the overcurrent protection circuits can not satisfy the restriction of the space within the electric coupling box which tends to be high-density.

SUMMARY OF THE INVENTION

Accordingly, the invention has been made in view of the aforesaid circumstance of the conventional technique, and an object of the invention is to provide an overcurrent protection circuit which can easily adjust the times of power interruption and automatic restoring.

In order to solve the aforesaid problem, the overcurrent protection circuit according to a first aspect of the invention comprises: input and output terminals connected to a driving power source and an external electric equipment, respectively; a relay including a contact point and a coil for opening and closing the contact point in response to a predetermined current passing through the coil to control power supply from the driving power source to the external electric equipment; a first transistor element coupled in series with the coil for controlling current flowing through the coil in accordance with a predetermined switching control signal; a bias voltage output circuit which includes a resistance value variable element which has characteristics that resistance value thereof changes in accordance with change of temperature thereof, and is disposed at a portion where a temperature is to be detected for detecting abnormal exothermic heat generated when an overcurrent flows through the external electric equipment, and a bias voltage adjusting resistor coupled in series with the resistance value variable element, wherein the resistance value variable element and the bias voltage adjusting resistor divides voltage applied from a bias power source to output a bias voltage; and a second transistor element for controlling supply of the switching control signal to the first transistor element based on the bias voltage.

According to the first aspect of the invention, the resistance value variable element detects abnormal exothermic heat caused by an overcurrent of the external electrical external electric equipment to change its resistance value. The bias voltage outputted from the bias voltage output circuit changes in accordance with the change of the resistance value of the external electrical equipment. Further, the relay is controlled so as to be opened/closed in accordance with the switching control signal which is controlled in its supply by the second transistor element based on the change of the bias voltage. According to such a control, power interruption at the time of abnormal exothermic heat caused by an overcurrent and automatic restoring upon extinction of the abnormal exothermic heat can be made possible. In the overcurrent protection circuit having such an automatic restoring function, the resistance value variable element is not connected in series with the coil unlike the conventional technique but contained in the bias voltage output circuit for supplying the switching control signal for exciting the coil. In particular, the resistance value variable element is connected in series with the bias voltage adjusting resistor. Thus, it is possible to select the resistance value variable element which does not depend on the current passing through the coil, by suitably selecting the bias voltage adjusting resistor.

In order to solve the aforesaid problem, the overcurrent protection circuit according to a second aspect of the invention is arranged, in the arrangement of the first aspect, in a manner that the resistance value variable element is a PTC having characteristics that its resistance value increases in a secondary-order curve or quadratic curve manner in accordance with increase of temperature thereof, wherein the bias voltage output circuit is configured in a manner that one end of the PTC is grounded and other end thereof is coupled to one end of the bias voltage adjusting resistor, and other end of the bias voltage adjusting resistor is coupled to the bias power source.

According to the second aspect of the invention, the PTC having the characteristics that its resistance value increases in the secondary-order curve or quadratic curve manner is employed as the resistance value variable element. When the resistance characteristics of the PTC is positively utilized, the overcurrent protection circuit can surely cope with the abrupt increase of the temperature at the portion as the temperature detection subject.

In order to solve the aforesaid problem, the overcurrent protection circuit according to a third aspect of the invention is arranged, in the arrangement of the second aspect, in a manner that the PTC is made in contact with a bus bar, which is disposed at a portion between the driving power source and the external electric equipment as the portion to be the temperature detection subject and electrically coupled to the driving power source and the external electric equipment, to detect temperature of the bus bar.

According to the third aspect of the invention, the PTC is made in contact with the first bus bar which is disposed at the portion between the driving power source and the external electric equipment thereby to detect temperature of the bus bar. Thus, an overcurrent flowing through the bus bar can be surely detected.

In order to solve the aforesaid problem, the overcurrent protection circuit according to a fourth aspect of the invention is arranged, in the arrangement of the third aspect, in a manner that each of the first transistor element and the second transistor element is an NPN transistor element which emitter is grounded, a base of the first transistor element is coupled to a collector of the second transistor element and is supplied with the switching control signal generated in response to an external control signal for driving and controlling the external electric equipment, and one end of the coil is coupled to a collector of the first transistor element.

According to the fourth aspect of the invention, each of the first transistor element and the second transistor element is an NPN transistor element which emitter is grounded, the base of the first transistor element is coupled to the collector of the second transistor element and is supplied with the switching control signal, and the one end of the coil is coupled to the collector of the first transistor element. Thus, the overcurrent protection circuit with high general-purpose properties can be obtained with a simple circuit configuration.

In order to solve the aforesaid problem, the overcurrent protection circuit according to a fifth aspect of the invention is arranged, in the arrangement of the fourth aspect, in a manner that the switching control signal is a high-level signal which is supplied to the first transistor element when the second transistor element is an off state.

According to the fifth aspect of the invention, the switching control signal is the high-level signal which is supplied to the first transistor element when the second transistor element is an off state. Thus, the opening/closing of the relay, that is, the power supply to the motor can be controlled more practically.

In order to solve the aforesaid problem, the overcurrent protection circuit according to a sixth aspect of the invention is arranged, in the arrangement of the first aspect, in a manner that the overcurrent protection circuit is mounted on a vehicle, and the external electric equipment is a motor constituting a fan for cooling a radiator which is supplied with power and driven from a vehicle mounted battery as the driving power source.

According to the sixth aspect of the invention, it becomes possible to detect abnormal exothermic heat caused by an overcurrent flowing through the motor constituting the fan for cooling the radiator of a vehicle. That is, although the motor constituting the fan for cooling the radiator becomes a main cause of abnormal exothermic heat of the first bus bar coupled to the motor, the invention can surely detect such abnormal exothermic heat to control the power supply. Thus, according to the invention, the breakage of resin parts such as resin plates etc. and electronic circuit parts relating to the motor driving within a vehicle can be surely prevented.

DETAILED DESCRIPTION OF PREFERRED EMBODIMENTS

The embodiment of the invention will be explained with reference to the accompanying drawings.

Figure 1A:
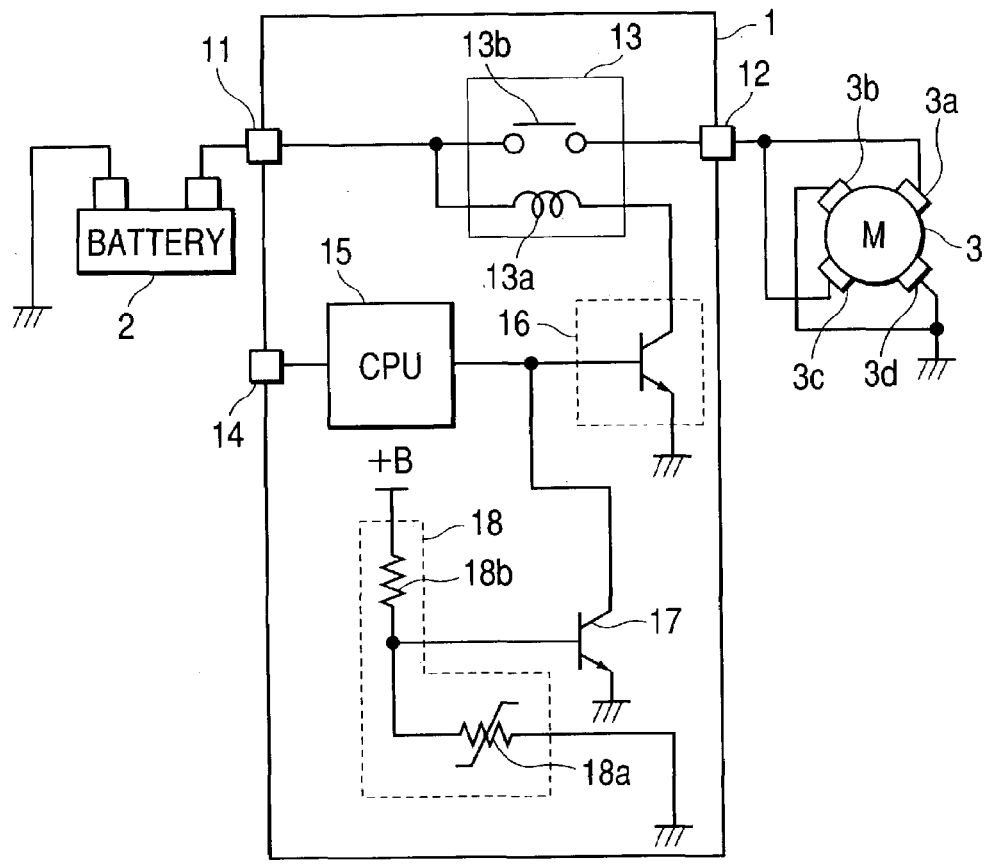
FIGS. 1A and 1B are circuit diagrams showing the overcurrent protection circuit according to the embodiment of the invention.
Figure 1B:
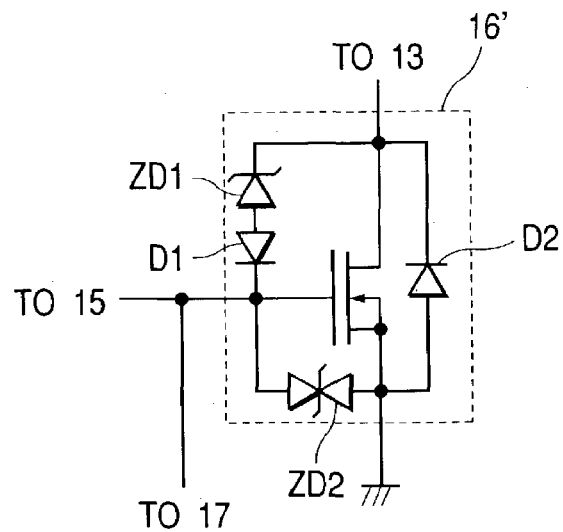

FIGS. 1A and 1B are circuit diagrams showing the overcurrent protection circuit according to the embodiment of the invention. As shown in FIG. 1A, the overcurrent protection circuit according to the embodiment is applied to a motor driving electric coupling box 1 which is one of functional circuit embedded type electric coupling boxes, for example. The motor driving electric coupling box 1 is mounted on a vehicle and has a power input terminal 11 and an external output terminal 12 which are coupled to a battery 2 (corresponding to a driving power source in claims) and a motor 3 (corresponding to an external electric equipment in claims), respectively. The battery 2 is a known battery of 12V and the motor 3 is a motor for driving a fan for cooling an engine, for example. The motor 3 is provided with two power source terminals 3a, 3c and two earth terminals 3b, 3d. The motor is a known four-terminal type motor which rotation speed is varied in accordance with a driving signal supplied to the power source terminals 3a, 3c. For example, when the power is supplied to one of the power source terminals 3a and 3c, the motor rotates at a low speed, whilst when the power is supplied to both the power source terminals 3a and 3c, the motor rotates at a high speed. In this case, the explanation will be made as to the case where the power is supplied to both the power source terminals 3a and 3c simultaneously.

Within the motor driving electric coupling box 1, various kinds of electronic parts and resin parts are housed and a bus bar of a conductive plate for distributing the power supplied from the battery 2 is disposed. The bus bar will be described later with reference to FIG. 2. A temperature detecting element such as a PTC (positive temperature coefficient thermistor) is disposed so as to be made in contact with the bus bar. Abnormal exothermic heat, that is, an overcurrent is detected by using the temperature detecting element.

Within the motor driving electric coupling box 1, a relay 13 is also provided which is arranged in a manner that a coil 13a excited by a predetermined current closes/opens a contact point 13b thereby to control the power supply from the battery 2 to the motor 3. Further, within the motor driving electric coupling box 1, a CPU 15 is also provided which is arranged to receive an external control signal inputted from a signal input terminal 14 and output a high-level signal (corresponding to a switching control signal of claims) for performing the opening/closing control of the relay 13.

Within the motor driving electric coupling box 1, a first transistor element 16, a second transistor element 17 and a bias voltage output circuit 18 constituting the overcurrent protection circuit are contained. The first transistor element 16 is connected in series with the coil 13a of the relay 13 thereby to control the current flowing through the coil 13a in response to the switching control signal. To be more concrete, the emitter of the first transistor element 16 is grounded, the collector thereof is connected to the one end of the coil 13a and the base thereof is supplied with the switching control signal.

The bias voltage output circuit 18 is configured by a PTC 18a and a bias voltage adjusting resistor 18b connected in series. The PTC 18a is disposed at a portion as a temperature detection subject for detecting abnormal exothermic heat generated when an overcurrent flows due to the locking state etc. of the motor 3. To be more concrete as described above, the PTC 18a is disposed so as to be made in contact with the bus bar which is disposed between the battery 2 and the motor 3, for example, and electrically connected to them. The PTC 18a is a known positive temperature coefficient thermistor having such a characteristic that its resistance value increases in a quadratic curve manner, for example, in accordance with the increase of temperature. The one end of the PTC 18a is grounded in order to effectively utilize the change of the resistance value due to the positive temperature coefficient characteristics. The bias voltage adjusting resistor 18b connected in series with the PTC 18a divides the voltage supplied from a bias power source +B and outputs the divided voltage as a bias voltage from the connection point between the PTC 18a and the bias voltage adjusting resistor 18b. The PTC 18a corresponds to a resistance value variable element in claims.

In this manner, since the PTC 18a having such a characteristic that its resistance value increases in the quadratic curve manner in accordance with the increase of temperature is connected and used as shown in FIG. 1A, the resistance characteristics of the PTC 18a is positively utilized and so the overcurrent protection circuit can surely cope with the abrupt increase of the temperature at the portion as the temperature detection subject. Alternatively, a normal thermistor having a characteristic that its resistance value decreases in accordance with the increase of temperature may be used instead of the PTC 18a. In this case, however, the connection relation between the thermistor and the bias voltage adjusting resistor is reverse to the connection relation between the PTC 18a and the bias voltage adjusting resistor 18b shown in FIG. 1A. That is, the bias power source +B is connected to the one end of the thermistor and the bias voltage adjusting resistor is grounded.

According to the aforesaid embodiment, each of the first transistor element 16 and the second transistor element 17 is a grounded-emitter type NPN transistor element. The base of the first transistor element 16 is connected to the collector of the second transistor element 17 and supplied with the switching control signal. Further, the collector of the first transistor element is connected to the one end of the coil 13a. Thus, the overcurrent protection circuit with high general-purpose properties can be obtained with a simple circuit configuration.

In the aforesaid configuration, for example, when a not-shown ignition switch is turned on, the external control signal is inputted into the CPU 15 through the signal input terminal 14. In response to the external control signal, the CPU 15 outputs the high-level signal to the base side of the first transistor element 16 in order to turn on the first transistor element 16. At this time, if the second transistor element 17 is in an off state, the high-level signal is applied to the base of the first transistor element 16, so that the first transistor element 16 is turned on. That is, in the case where the resistance value of the PTC 18a is low since the motor 3 is driven normally and so the temperature of the bus bar is normal, the bias voltage is almost equal to the ground voltage. Thus, the second transistor element 17 is in an off state. Accordingly, the current flows into the coil 13a of the relay 13 through the power input terminal 11 from the battery 2 thereby to close the contact point 13b. As a result, the current from the battery 2 is supplied to the power source terminals 3a, 3c through the contact point 13b of the relay 13 and the external output terminal 12, whereby the motor 3 is placed in a driven state. Incidentally, the timing where the high-level signal is outputted may be a time point where the ignition switch is turned on.

on the other hand, supposing that the vehicle runs on a flooded road, for example, the fan driven by the motor 3 is locked or placed in a state similar thereto due to the flooding. However, since the motor 3 tries to continue to drive the fan against the resistance of the water, an overcurrent called a lock current flows. That is, the overcurrent flows into the bus bar and so abnormal exothermic heat is generated from the bus bar. Due to the abnormal exothermic heat, the PTC 18a increases its resistance value, so that the bias voltage from the connection point is applied to the base of the second transistor element 17. Thus, the second transistor element 17 is turned on to make conductive between the collector and the emitter of the second transistor element 17, whereby the first transistor element 16 can not be turned on in response to the switching control signal from the CPU 15. Therefore, since the current stops flowing into the coil 13a of the relay 13, the contact point 13b of the relay 13 is opened thereby to stop the current supply to the motor 3. As a result, the overcurrent disappears and so the temperature of the bus bar reduces, whereby the electric parts, the resin parts and the motor 3 are protected from the overcurrent.

If this state is continued and the current supply to the motor 3 is kept to be stopped, the cooling effect of the engine can not be obtained. Thus, in the case where the vehicle passed the flooded road and the temperature of the bus bar reduced sufficiently, for example, the motor 3 is started to be driven again due to the function reverse to the aforesaid function. That is, when the current supply is stopped and the temperature of the bus bar reduced sufficiently, the resistance value of the PTC 18a reduces and so the bias voltage reduces thereby to place the second transistor element 17 in an off state. Thus, the first transistor element 16 turned on again. As a result, the current flows through the coil 13a of the relay 13 to close the contact point 13b of the relay 13 thereby to start the current supply to the motor 3 again, so that the motor 3 is driven again. In this manner, the embodiment has also an automatic restoring function. Incidentally, the embodiment is supposed that the sufficient countermeasure for water-proof is performed and so there arises no problem such as electric leakage or short circuit due to the flooding.

In this manner, the embodiment shown in FIG. 1A has the function of interrupting power supply at the time of abnormal exothermic heat caused by an overcurrent and the automatic restoring function upon extinction of the abnormal exothermic heat. In this embodiment, the PTC 18a is not connected in series with the coil 13a unlike the conventional example but contained within the bias voltage output circuit 18 for supplying the switching control signal for exciting the coil 13a. In particular, the PTC 18a is connected in series with the bias voltage adjusting resistor 18b. Thus, it is possible to select the PTC 18a which is independent from the current passing through the coil 13a by suitably selecting the bias voltage adjusting resistor 18b. Furthermore, by adjusting the current passing through the PTC 18a in the steady state, it is possible to preheat the PTC thereby to make the circuit likely be a trip (interruption) state or, on the contrary, it is possible to make the circuit not to restore from the trip state until the power source is turned off when the circuit is once placed in the trip state.

According to the embodiment, since the high-level signal generated by the CPU in response to the external control signal is supplied to the first transistor element 16 when the second transistor element 17 is in an off state, the power supply to the motor 3 can be controlled more practically. Incidentally, the first transistor element 16 shown in FIG. 1A maybe a first transistor element 16' shown in FIG. 1B. The first transistor element 16' is an PET element including diodes D1, D2 and Zener diodes ZD1, ZD2 and has a switching function similar to that of the first transistor element 16 shown in FIG. 1A.

Figure 2:
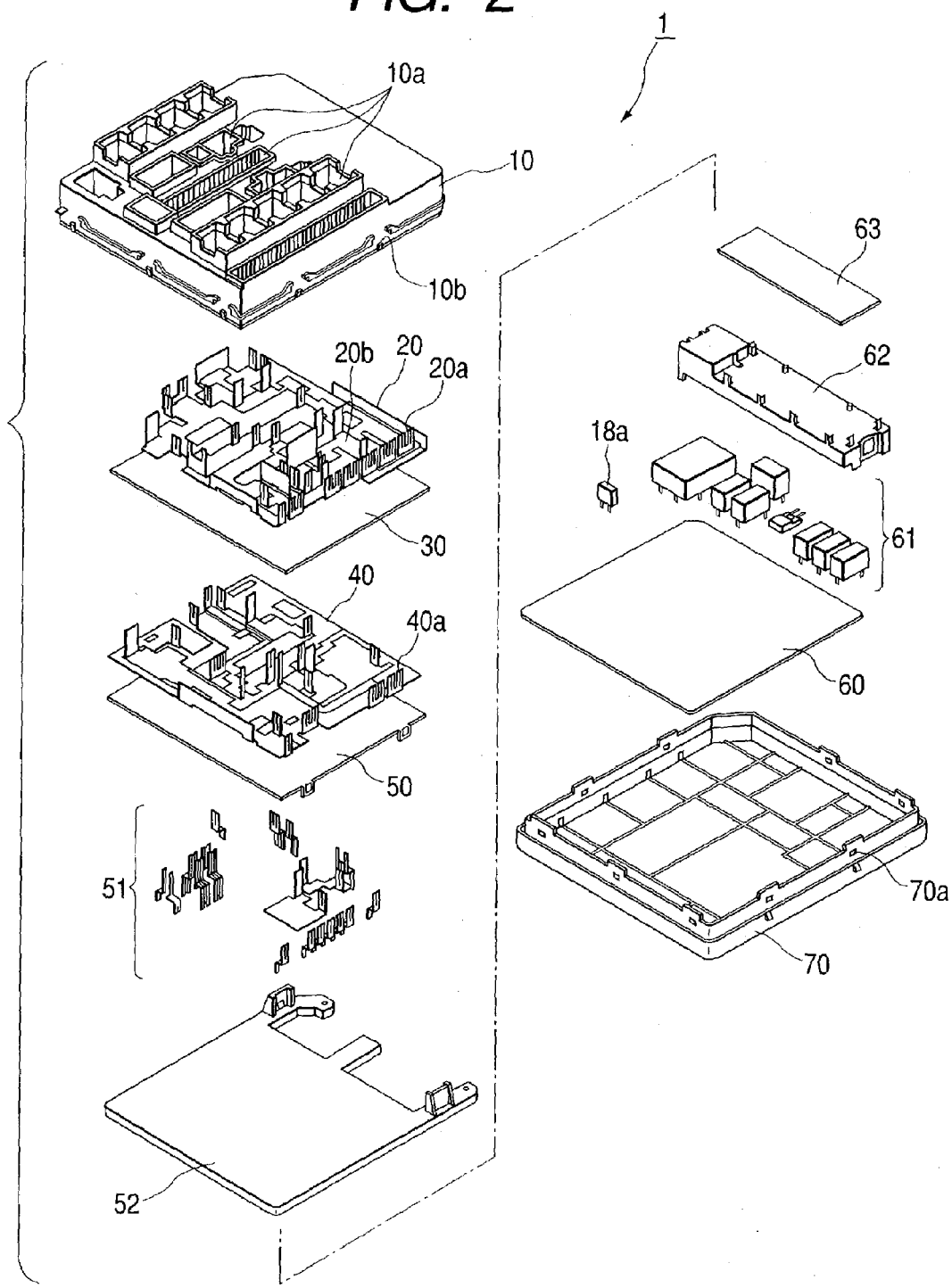
FIG. 2 is an exploded perspective view showing a motor driving electric coupling box to which the overcurrent protection circuit of the embodiment is applied.

FIG. 2 is an exploded perspective view showing the motor driving electric coupling box 1 to which the aforesaid overcurrent protection circuit is applied. As shown in FIG. 2, the motor driving electric coupling box 1 is arranged in a manner that constituent parts group such as a first bus bar 20, a wiring board 30, a second bus bar 40, a terminal plate cover 50, bus bar board coupling terminals 51, a terminal plate 52, a main circuit board 60, electronic parts 61, an electronic parts holder 62, a sub-circuit board 63 etc. are housed within a casing formed by an upper cover 10 and a lower cover 70. As shown in FIG. 2, the main circuit board 60, the terminal plate 52, the terminal plate cover 50, the second bus bar 40, the wiring board 30 and the first bus bar 20 are laminated in this order.

The upper cover 10 is made of resin and configured in a quadrangular box shape so as to be opened downward. On the upper surface of the upper cover, socket shaped connector portions 10a for fuses, relays etc. are formed each so as to be opened upward. Terminals described later are housed and arranged within the connector portions in a manner that they are protruded at the insides of the connector portions 10a, respectively. A plurality of lock nails 10b used at the time of integrating the upper cover with the lower cover 70 are formed at the side surfaces of the upper cover 10.

A plurality of tab-shaped connector terminals 20a are continuously formed so as to be erected upward on the first bus bar 20, in this example. These connector terminals 20a serve as a part of the terminals housed and arranged within the connector portions 10a. A contact piece described later is formed at a PTC upper portion 20b which is a portion corresponding to an upper portion of the PTC. The wiring board 30 is disposed beneath the contact piece.

The second bus bar 40 is laminated beneath the first bus bar 20 and the wiring board 30. The second bus bar 40 has similar configuration as the first bus bar 20 in a manner that a plurality of tab-shaped connector terminals 40a are continuously formed so as to be erected upward on the second bus bar. These connector terminals 40a serve as a part of the terminals housed and arranged within the connector portions 10a. A contact piece like that of the first bus bar 20 is not formed at the second bus bar 40. Each of the first bus bar 20 and the second bus bar 40 has a belt-like shape and has conductivity, of course.

The terminal plate cover 50 and the terminal plate 52 are laminated beneath the second bus bar 40 so as to sandwich the bus bar board coupling terminals 51 and hold them therebetween in the vertical direction. Each of the terminal plate cover 50 and the terminal plate 52 is made of resin in order to electrically insulate basically between the main circuit board 60 side and the bas bar side. The bus bar board coupling terminals 51 are conductive, of course. To be more in detail, the bus bar board coupling terminals 51 are attached to a plurality of not-shown terminal holding portions formed at the terminal plate 52 and electrically made in contact with the main circuit board 60 side at the rear side of the terminal plate 52, respectively. The terminal plate cover 50 has a plurality of not-shown window portions at portions corresponding to the predetermined bus bar board coupling terminals 51 attached to the terminal plate 52, respectively. The bus bar board coupling terminals 51 are sandwiched and adhered to the terminal plate 52 in a manner that the bus bar board coupling terminals 51 are protruded upward through the window portions, respectively.

The main circuit board 60 is laminated beneath the terminal plate 52. The electronic parts 61 such as the relay 13, a regulator, diodes etc. and the PTC 18a are mounted on the main circuit board 60. These electronic parts 61 are covered by the electronic parts holder 62 which lower portion is opened. The sub-circuit board 63 is mounted on the upper surface of the electronic parts holder 62. The CPU 15 etc are mounted on the sub-circuit board 63. The overcurrent protection circuit shown in FIG. 1A is mounted on the sub-circuit board 63. In this respect, the overcurrent protection circuit may be mounted on the main circuit board 60.

The constituent parts group shown by the reference numerals 20, 30, 40, 50–52 and 60–63 etc. are housed within the lower cover 70 which is made of resin and configured in a quadrangular dish or tray shape. A plurality of lock holes 70a are formed at the side surfaces of the lower cover 70. The upper cover 10 is covered from the upper side and the lock nails 10b are engaged with the lock holes 70a, respectively, whereby the upper cover 10 and the lower cover 70 are integrated.

Figure 3:
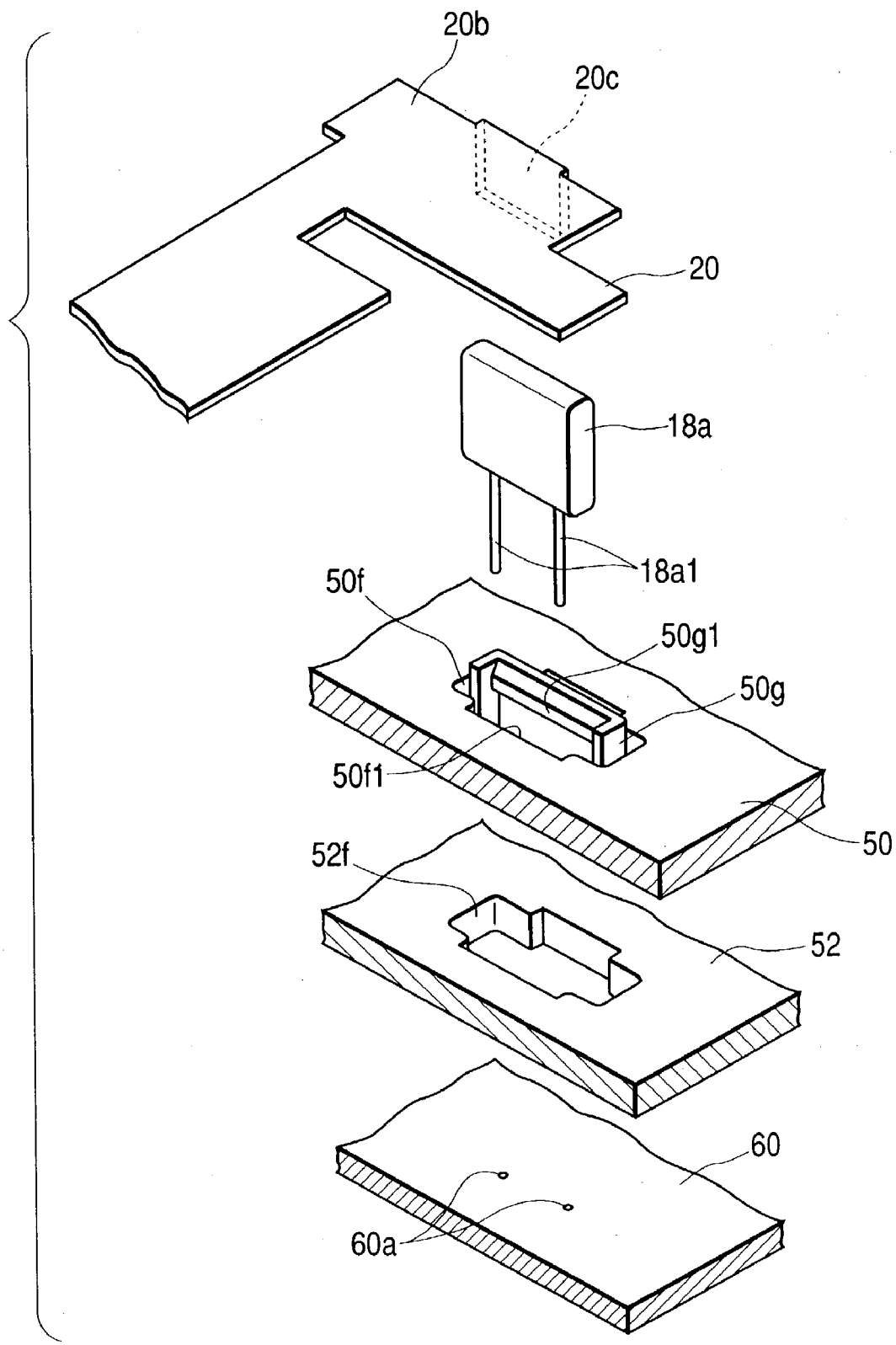
FIG. 3 is a partial exploded perspective view for explaining the configuration of the peripheral portion of a PTC window portion.
Figure 4:
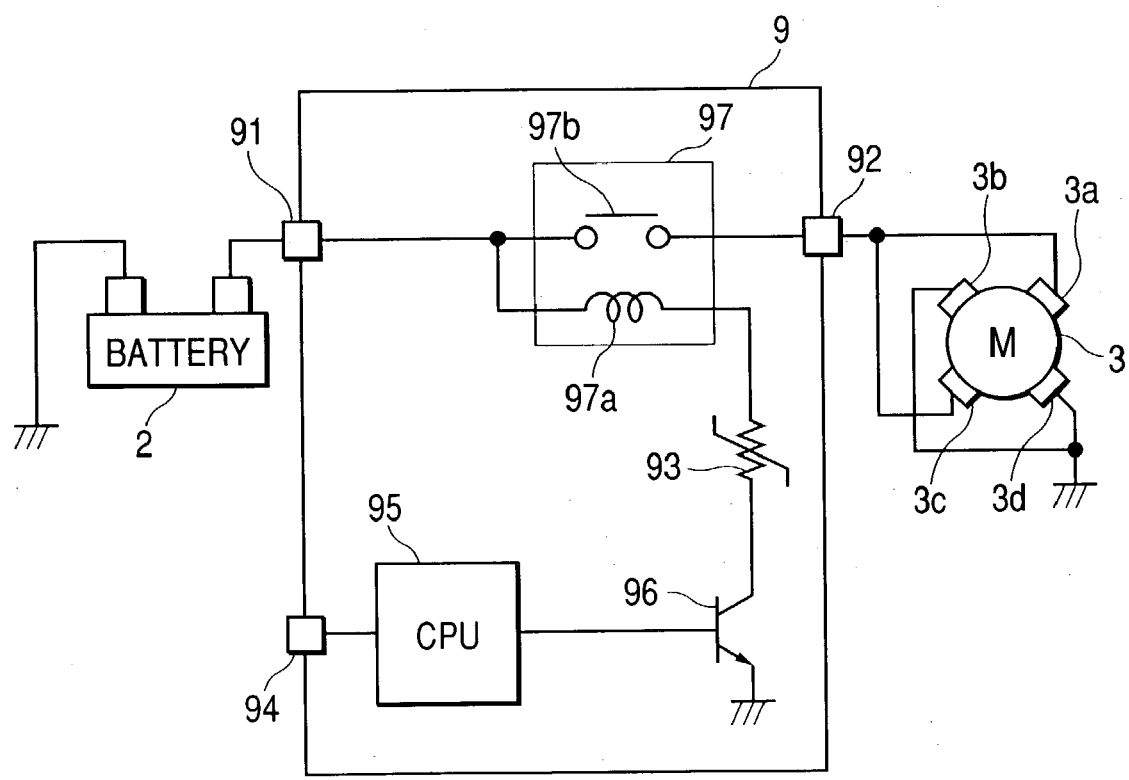
FIG. 4 is a circuit diagram showing an example of conventional overcurrent protection circuits.

FIG. 3 is a partial exploded perspective view for explaining the configuration of the peripheral portion of the FTC window portion. As shown in FIG. 3, a contact piece 20c bent downward in an L-shape in its section is integrally formed with the first bus bar 20 at the side edge portion of the FTC upper portion 20b of the first bus bar 20. The contact piece 20c is made in contact with the side surface of the FTC 18a.

The PTC 18a acts to increase its resistance value according to heat generation when an overcurrent flows through the bus bar. The current flowing through the bus bar reduces or is interrupted based on this phenomenon, so that the circuits and the resin members etc. are protected. Such current control is performed by controlling the relay 13 so as to be opened/closed, for example. Although the PTC 18a is shown as an example so as to have an outer configuration of a rectangular plate shape with a predetermined thickness, the PTC may be one with a generally known circular shape. The PTC 18a has lead terminals 18a1 which are extending downward and soldered to the main circuit board 60.

A PTC window portion 50f is formed at the terminal plate cover 50. The PTC window portion 50f is formed in correspondence with the PTC 18a. In particular, a notched portion 50f1 is formed at the one side wall portion side of the PTC window portion so that the contact piece 20c can pass therethrough. A hinge portion 50g, which is configured to partially surround the PTC 18a when seen from the upper side, is integrally formed with the terminal plate cover 50 at the other side wall portion of the PTC window portion 50f opposing to the notched portion 50f1. The hinge portion 50g is configured in a U-shape in its section as described later and provided with a projection 50g1 at the tip end portion thereof.

The terminal plate 52 is provided with a window portion 52f having the same shape as the PTC window portion 50f. The main circuit board 60 is provided with terminal holes 60a through which the lead terminals 18a1 of the PTC 18a are passed and soldered.

The contact piece 20c is passed through a slit between the hinge portion 50g (the projection 50g1, strictly speaking) and the notched portion 50f1 of the PTC window portion 50f. In this case, the PTC 18a is made in contact with pressure to the contact piece 20c due to the elastic force of the hinge portion 50g. Thus, the contact piece 20c, that is, the first bus bar 20 serving as the temperature detection subject is made in contact with the PTC 18a and so the temperature is detected surely.

As described above, according to the embodiment, power supply is interrupted at the time of the abnormal exothermic heat caused by an overcurrent and the automatic restoring is performed upon extinction of the abnormal exothermic heat, and further it becomes possible to select the PTC 18a which does not depend on the current flowing through the coil 13a of the relay 13. Thus, it is possible to adjust easily the times of the power interruption caused by the overcurrent and the automatic restoring. The embodiment is effective particularly when applied to the electric coupling box mounted on a vehicle. That is, although there exist many electric equipments etc. such as a motor constituting a radiator cooling fan capable of being a main cause of exothermic heat within a vehicle, the abnormal exothermic heat generated from the electric equipments etc. can be surely detected and the power supply is controlled in accordance with the detection. Thus, while utilizing an arbitrary PTC, the breakage due to the abnormal exothermic heat of the resin parts such as the resin plates etc. and the electronic circuit parts contained in the electric equipments etc. can be surely prevented.

According to the invention, the electric equipments and the configurations of the bus bars etc. are not limited to those shown in the embodiment, and other kinds of electric equipments and other configurations of the bus bars etc. may be employed therefor. Further, the kinds of the resistance value variable element contained in the bias voltage output circuit and the connection relation between the resistance value variable element and the bias voltage adjusting resistor may be changed. Furthermore, it is possible to change the NPN transistor shown in the embodiment into a PNP transistor. The invention includes various kinds of modification changed within a range not departing from the gist of the invention.

As described above, according to the invention, the resistance value variable element 18a is not connected in series with the coil 13a unlike the conventional technique but contained in the bias voltage output circuit 18 for supplying the switching control signal for exciting the coil 13a. In particular, the resistance value variable element 18a is connected in series with the bias voltage adjusting resistor 18b. Thus, it is possible to select the resistance value variable element 18a which does not depend on the current passing through the coil 13a, by suitably selecting the bias voltage adjusting resistor 18b. As a result, the times of the power interruption caused by the overcurrent and the automatic restoring can be adjusted easily.

According to the invention, the PTC 18a having the characteristics that its resistance value increases in the secondary-order curve or quadratic curve manner is employed as the resistance value variable element 18a. When the resistance characteristics of the PTC 18a is positively utilized, the overcurrent protection circuit can surely cope with the abrupt increase of the temperature at the portion as the temperature detection subject.

According to the invention, the PTC 18a is made in contact with the first bus bar 20 which is disposed at the portion between the driving power source 2 and the external electric equipment 3 thereby to detect temperature of the first bus bar 20. Thus, an overcurrent flowing through the bus bar can be surely detected.

According to the invention, each of the first transistor element 16 and the second transistor element 17 is the NPN transistor element which emitter is grounded, the base of the first transistor element 16 is coupled to the collector of the second transistor element 17 and is supplied with the switching control signal, and the one end of the coil 13a is coupled to the collector of the first transistor element 16. Thus, the overcurrent protection circuit with high general-purpose properties can be obtained with a simple circuit configuration.

According to the invention, the switching control signal is the high-level signal which is supplied to the first transistor element 16 when the second transistor element 17 is an off state. Thus, the opening/closing of the relay 13, that is, the power supply to the motor 3 can be controlled more practically.

According to the invention, it becomes possible to detect abnormal exothermic heat caused by an overcurrent flowing through the motor 3 constituting the fan for cooling the radiator of a vehicle. That is, although the motor constituting the fan for cooling the radiator becomes a main cause of abnormal exothermic heat of the first bus bar 20 coupled to the motor, the invention can surely detect such abnormal exothermic heat to control the power supply. Thus, according to the invention, while utilizing an arbitrary PTC, the breakage of resin parts such as resin plates etc. and electronic circuit parts relating to the motor driving can be surely prevented.

What is claimed is:

1. An overcurrent protection circuit comprising:
   input and output terminals connected to a driving power source and an external electric equipment, respectively;
   a relay including a contact point and a coil for opening and closing the contact point in response to a predetermined current passing through the coil to control power supply from the driving power source to the external electric equipment;
   a first transistor element coupled in series with the coil for controlling current flowing through the coil in accordance with a predetermined switching control signal;
   a bias voltage output circuit including,
      a resistance value variable element which has characteristics that resistance value thereof changes in accordance with change of temperature thereof, and is disposed at a portion where a temperature is to be detected for detecting abnormal exothermic heat generated when an overcurrent flows through the external electric equipment, and
      a bias voltage adjusting resistor coupled in series with the resistance value variable element, wherein the resistance value variable element and the bias voltage adjusting resistor divides voltage applied from a bias power source to output a bias voltage; and
   a second transistor element for controlling supply of the switching control signal to the first transistor element based on the bias voltage,
   wherein the resistance value variable element is a PTC element and the bias voltage output circuit is configured in a manner that one end of the PTC element is grounded and other end thereof is coupled to one end of the bias voltage adjusting resistor, and other end of the bias voltage adjusting resistor is coupled to the bias power source.

2. The overcurrent protection circuit according to claim 1, wherein the PTC element has characteristics that resistance value thereof increases in quadratic curve manner in accordance with increase of temperature thereof.

3. The overcurrent protection circuit according to claim 2, wherein the PTC element is made in contact with a bus bar, which is disposed at a portion between the driving power source and the external electric equipment as the portion where the temperature is to be detected and electrically coupled to the driving power source and the external electric equipment, to detect temperature of the bus bar.

4. The overcurrent protection circuit according to claim 3, wherein each of the first transistor element and the second transistor element is an NPN transistor element which emitter is grounded, a base of the first transistor element is coupled to a collector of the second transistor element and is supplied with the switching control signal generated in response to an external control signal for driving and controlling the external electric equipment, and one end of the coil is coupled to a collector of the first transistor element.

5. The overcurrent protection circuit according to claim 4, wherein the switching control signal is a high-level signal which is supplied to the first transistor element when the second transistor element is an off state.

6. The overcurrent protection circuit according to claim 1, wherein the overcurrent protection circuit is mounted on a vehicle, and the external electric equipment is a motor constituting a fan for cooling a radiator which is supplied with power and driven from a vehicle mounted battery as the driving power source.

* * * * *